July 13, 1965 C. D. FLANAGAN 3,195,044
RESISTANCE-CHANGE TEMPERATURE-MEASURING APPARATUS FOR
MOTOR WINDINGS AND THE LIKE
Filed March 29, 1960 2 Sheets-Sheet 1

Charles D. Flanagan,
Inventor,
Koenig and Pope,
Attorneys.

(RUN)

(CALIBRATE)

(DISCONNECT)

Charles D. Flanagan,
Inventor.
Koenig and Pope,
Attorneys.

United States Patent Office 3,195,044
Patented July 13, 1965

3,195,044
RESISTANCE-CHANGE TEMPERATURE-MEASURING APPARATUS FOR MOTOR WINDINGS AND THE LIKE
Charles D. Flanagan, Attleboro, Mass., assignor to Texas Instruments Incorporated, Dallas, Tex., a corporation of Delaware
Filed Mar. 29, 1960, Ser. No. 18,429
8 Claims. (Cl. 324—62)

This invention relates to resistance-change type temperature-measuring apparatus for electrically conductive devices such as, for example, electrical windings, and with regard to certain more specific features, to such means for measuring varying motor winding temperatures.

Among the several objects of the invention may be noted the provision of a circuit adapted to provide an accurately repeatable procedure for the measurement of motor and other winding temperatures including those which are rapidly changing; the provision of a relatively inexpensive circuit for the purpose employing a modified thermocouple recorder for its output; the provision of apparatus of the class described which permits the continuous recording of temperature of a de-energized winding immediately after de-excitation; the provision of apparatus of the class described providing a constant-voltage source for an unbalanced electrical bridge employed with the recorder; the provision of means for rapidly interconnecting a substantially constant D.C. current to the winding to be measured when the winding is disconnected from an A.C. power source; and the provision of apparatus of this class which may be conveniently calibrated to obtain more accurate representations of winding temperatures. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 1:
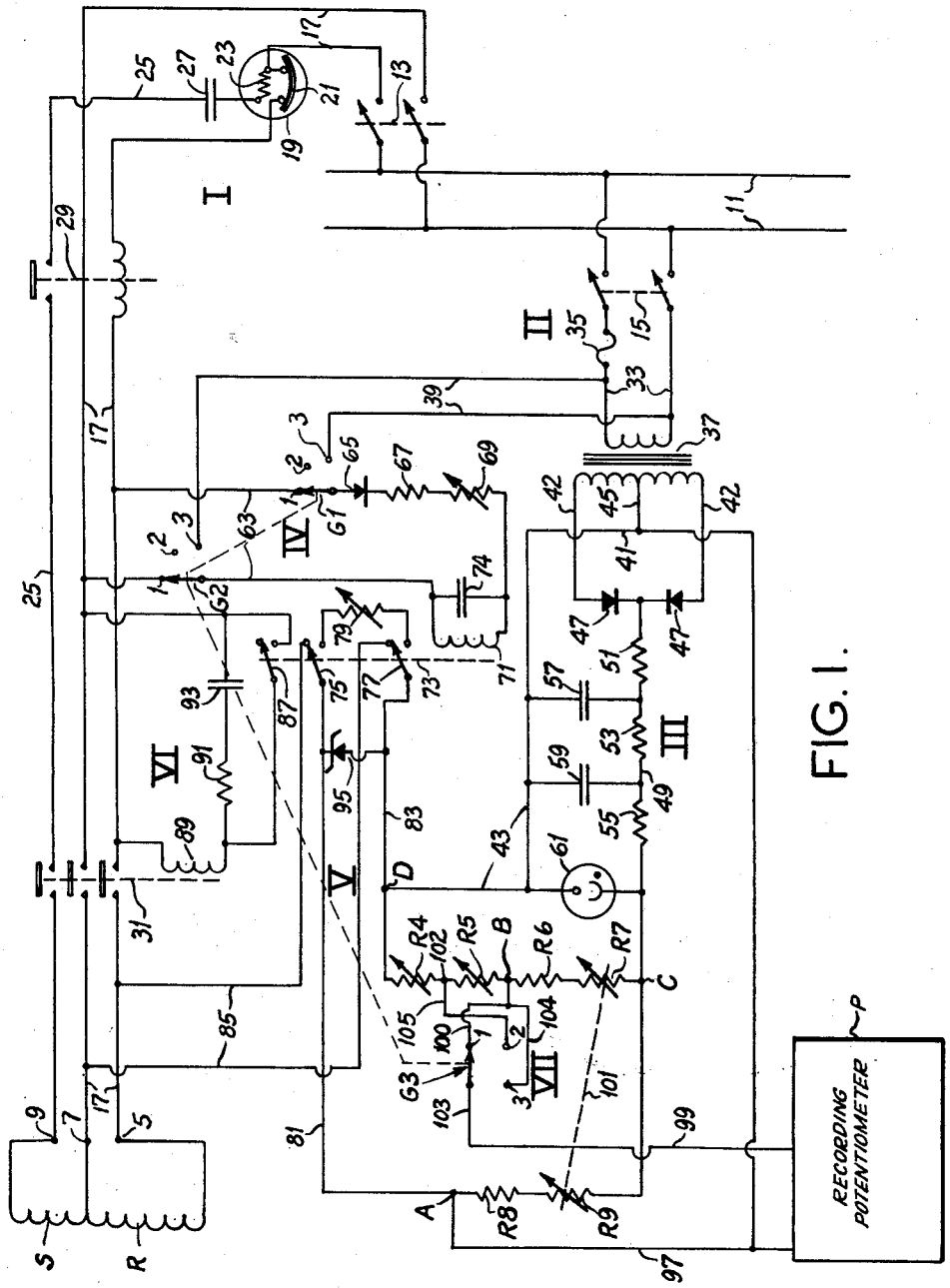
Figure 2:
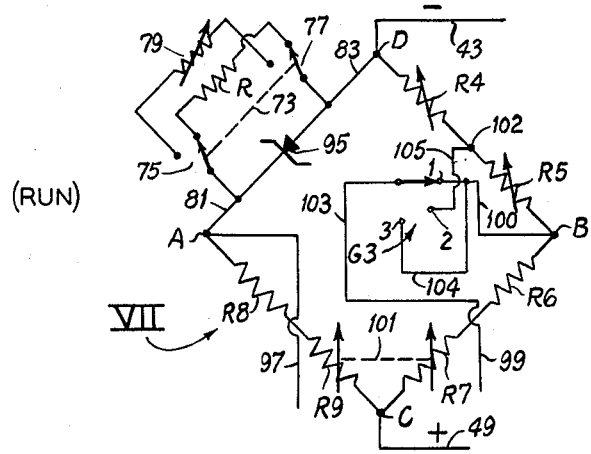
Figure 3:
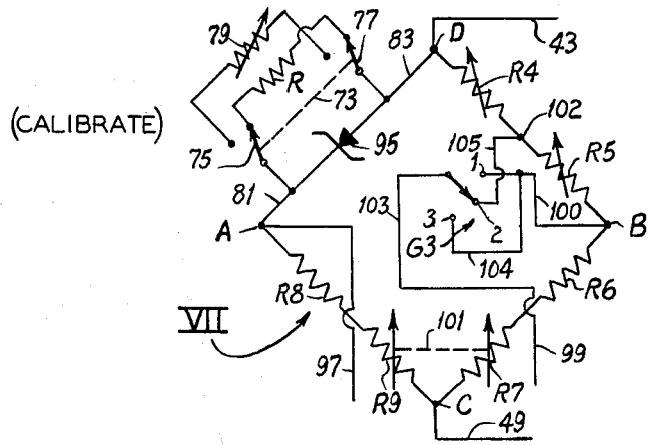
Figure 4:
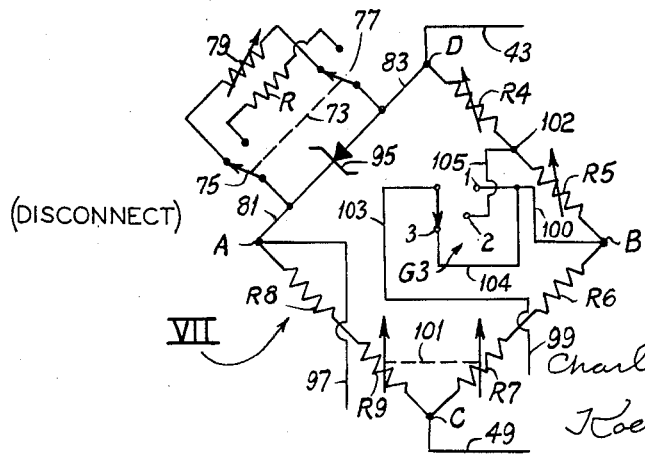

In the accompanying drawings, in which one of various possible embodiments of the invention is illustrated, FIG. 1 is a wiring diagram illustrating a circuit embodying the invention; and FIGS. 2, 3 and 4 are wiring diagrams showing certain bridge portions of the FIG. 1 circuit in three different positions, respectively, of a part of a gang-operated rotary selector switch.

Corresponding reference characters indicate corresponding parts throughout the several views of the drawings.

Referring now more particularly to FIG. 1, there are shown at numerals I–VII various sections of a converter and switching circuit adapted to provide the input voltage to a recording potentiometer P. A suitable commercial recorder that may be used is a Leeds & Northrup Type G, sold under the trademark Speed-O-Max which usually includes a thermocouple D.C. source. For use in the invention the usual thermocouple input portions are removed and the circuit of FIG. 1 reconnected to substitute for its removed thermocouple voltage supply. It is in effect a millivoltmeter or potentiometer which records D.C. voltages on a moving chart in the known manner. Voltage changes recorded are a function of resistance changes in a bridge section VII (to be described), and such resistance changes are a function of temperature changes in a device (winding R) to be measured; thus the recorder P in effect will indicate temperature changes, as will appear.

Numeral 11 indicates a conventional 60-cycle 117-volt power circuit for supplying A.C. to Sections I and II through line switches 13 and 15, respectively. Supply lines 17 for A.C. current extend from switch 13 to terminals 5 and 7 of a motor run winding R, the resistance changes of which are to be measured, whereby its temperature changes may be asscertained from the usual correlation between resistance and temperature in a conductive element. In one leg of lines 17 is a thermal protector 19, which includes a thermostatic switch 21 and a heater 23, the latter being connected through a line 25 with a terminal 9 of a start winding S of the motor, a start capacitor 27 being included in line 25. Heater 23 cooperates with thermostatic switch 21 in the usual manner, to provide overload protection for the coil S during the starting of the motor.

At numeral 29 is shown a starting relay for the start winding S, and at numeral 31 is indicated a contactor relay for lines 17 and 25. After the start winding is de-energized by starting relay 29, the run winding R operates upon current supplied over lines 17 through the protector 19.

With switch 31 closed, the bimetallic switch 21 in the usual way responds to excessive current in the circuit 17, which traverses bimetallic switch 21, and thus responds to any excessive temperature rise in the winding R, due to unusual conditions such as a locked rotor, overload or the like. Thermal protector 19 may be located in close proximity to the winding R in the usual and conventional manner so as to be responsive to and sense increases in temperature of the winding R and heater 23, as well as to heat produced by the circuit 17 current traversing the bimetallic switch 21. Upon the temperature reaching unsafe values, the thermostatic switch 21 will open the circuit 17, thus permitting the run winding R to cool. After sufficient cooling, the switch 21 will reclose, again to place the motor on the lines 17. Such cycling action may continue indefinitely until steps are taken to eliminate the unusual condition. Section I may be referred to as a winding supply or exciter and protective circuit.

Section II may be referred to as a second supply circuit. It consists of connections 33 through switch 15 and a fuse 35 from the A.C. supply circuit 11 to a transformer 37. It also supplies A.C. over lines 39 to a pair of disconnect contacts 3 in two components G1 and G2 of a rotary gang-operated control switch. This switch has three components, G1, G2, G3, the third component being shown in an unbalanced bridge section VII, to be described. The term "bridge" as employed herein is not a bridge in the usual sense of the term, in that the bridge employed in the instant invention does not connect two points of equal potential but is instead an unbalanced bridge. Each of the three components G1, G2, G3 of the gang-operated switch has a run contact 1, a calibrating contact 2, and a disconnect contact 3. All sets of contacts 1, 2 and 3 in the respective sections G1, G2 and G3 operate simultaneously either to open or close.

Section III, which receives A.C. through transformer 37, has for its purpose the rectification of this A.C. to constant-voltage D.C. This section may be referred to as a high-impedance, constant-voltage converter section or source for points C and D of the unbalanced bridge Section VII. Section III is constituted by a loop 41 which is connected with the secondary of the transformer 37. End connections are at 42 and a center connection at 45. Rectifiers 47 change the A.C. in the loop to D.C., the voltage of which is applied over lines 49 and 43 to points C and D in the bridge Section VII. Resistances 51, 53, 55 in line 49, and capacitances 57 and 59 between lines 43 and 49, form a high-impendance filter net for suppressing ripples in the D.C. current formed. A cold cathode gas tube 61, adapted to pass current at a predetermined voltage, is connected between lines 43 and 49 for maintaining a substantially constant D.C. voltage level across said points C and D.

Section IV is a D.C. time-delay relay circuit which receives an A.C. supply either from lines 17, with which it has connections 63, or from lines 33 via leads 39. The required alternative connections are made through gang switch sections G1 and G2, as will be detailed below. Connections 63 contain a D.C. rectifier 65, resistances 67, 69 and a capacitor 74 for time-delay purposes, resistance 69 being adjustable to provide any desired delay, for example, a 90 milli-second delay in the action of Section IV after its excitation. Section IV is adapted with time delay after its excitation to excite the coil 71 of a three-pole double-throw transfer relay switch 73.

It should be understood that if desired other components i.e. a low voltage time-delay relay, mechanical or thermal means for providing desired time delay for relay 71 may be substituted for capacitor 74, rectifier 65 and resistances 67 and 69, which together comprise an adjustable time delay circuit for relay 71.

A resistance load-switching circuit V contains two components 75 and 77 of the relay switch 73, arranged alternatively to connect the winding R across the points A and D, or to connect an adjustable dummy or ballast resistance across these points. The dummy resistance 79 has a maximum value equal to the greatest resistance to be expected in any winding to be tested. By adjustment, the resistance of any particular winding R under test and that of the dummy or ballast resistance 79 may be matched, so that one may be substituted for the other across points A and D. Conductors 81 and 83 form the connections from A and D, respectively, to the poles of the relay switch components 75 and 77. Wires 85 lead to one pair of contacts of relay switch elements 75 and 77 and serve to complete the connections between A and D and the winding R when the switch elements 75, 77 are in the position shown in FIG. 1. When the switch elements 75 and 77 are in their alternative positions on their other contacts, the ballast resistance 79 is placed across points A and D by lines 81 and 83 (see FIG. 4, for example). A Zener diode 95 between lines 81 and 83 functions as a safety device between points A and D. It passes current at two volts or more, for example.

Thus it is apparent that either the winding R or the ballast resistance 79 may be placed across the points A and D by operation of switch elements 75 and 77.

Relay switch 73 also includes an additional component 87 located in an A.C. starting relay Section VI, which has for its purpose the placement of the windings S and R on the lines 17 and 25. This circuit includes relay coil 89 of the contactor switch 31. It also includes a resistance 91 and a capacitor 93 across lines 17 for arc-suppression purposes. When Section IV is deenergized, switch 73 is in the position shown in FIG. 1, in which case winding R is connected across points A and D. Also Section VI is consequently deenergized. When circuit IV is energized, switch 73 takes its alternate position in which winding R is disconnected from points A, D and placed on lines 17. At this time the ballast resistance 79 is connected across points A and D. When the switch element 87 closes Section VI, the contactor 31 is closed; otherwise the contactor is open.

Section VII is the unbalanced bridge circuit above mentioned, which has been drawn in FIGS. 2–4. The bridge has four junctions A, B, C, D. Constant D.C. voltage from Section III is applied to points C, D over lines 49 and 43. Points A and B are connected with the D.C. recorder P through lines 97 and 99, respectively.

Referring to FIGS. 2–4, the bridge consists of four arms, one arm A–D of which is constituted in part by lines 83 and 81 which through relay switch components 77 and 75 admit of connecting into arm A–D either the resistance winding R or the ballast resistance 79 with the Zener diode 95. The Zener diode is in effect connected across the poles of switch elements 77 and 75. Another arm D–B of the bridge is constituted by adjustable series-connected resistances $R_4$ and $R_5$. A third arm B–C of the bridge is constituted by resistances $R_6$ and $R_7$, the latter being adjustable. A fourth arm C–A is constituted by resistances $R_9$ and $R_8$, the former of which is adjustable. The adjustments for resistances $R_7$ and $R_9$ are connected for common control, as indicated at 101. One of the rotary switch elements G3 has a pole connected at 103 to line 99. The run contact 1 of this element G3 is connected at 100 with junction B and with contact 3 by line 104. Its contact 2, called a calibrating contact, is connected to a point 102 between resistances $R_4$ and $R_5$ by wire 105, so that when the switch arm of section G3 is on contact 2, the resistance $R_5$ will be switched out of the bridge arm D–B and switched into the adjacent bridge arm B–C.

Operation is as follows:

The rotary switch components G1, G2, G3 should be in disconnect position 3 whenever there is no motor connected to lines 17, 25. If then switch 15 is inadvertently closed and switch 13 left open, lines 39 will excite the time-delay relay circuit IV, thus operating relay 73 to switch the ballast resistance 79 across lines 81 and 83 of the bridge arm A–D (see FIG. 4). This is to avoid an undesirable condition that might occur if G1 and G2 were on run position 1, for then D.C. voltage from Section III would be applied to bridge Section VII in the absence of any resistance in arm A–D. This is not a desirable condition for the recorder mechanism, although the Zener safety diode 95 protects against any damaging voltage that might be impressed on wires 81 and 83.

Calibration may be carried out by connecting the windings S and R on lines 17 and 25 and setting rotary switch components G1, G2, G3 on the calibration position 2, which in the case of components G1 and G2 deprives Section IV of A.C. even though switch 13 may be closed. Therefore, switch 73 is in the position of its components 77, 75, 87, as shown in FIGS. 1 and 3. This frees the winding R of A.C. and places it in the bridge arm A–D, ready for D.C. excitation when switch 15 is closed. Closure of switch 15 is next assumed. The stated setting of switch section G3 on its calibration position 2 (FIG. 3) results in shunting out resistance $R_5$ in bridge arm D–B.

The resistance $R_4$ may at this time be adjusted (switch 15 on) to balance out the resistance of the motor winding circuit constituted by wires 85, 81 and 83, including the contact resistances of switch elements 75 and 77. This is accomplished by short-circuiting the terminals 5 and 7 and then adjusting $R_4$ until the recorder shows 0°. After this the short circuit is removed. It may be mentioned that in order to maintain the contact resistance in switch parts 77, 75 substantially constant, these contacts may preferably be of the mercury-wetted type known in the art.

Next the bridge is adjusted at $R_9$ and $R_7$ to establish current in R, $R_8$ and $R_9$ such as to match the change in voltage drop per degree of temperature change in the winding R to the change in voltage required in the recorder per degree of temperature indication. With the specific material of winding R employed, which in this example is copper, an adjustment of $R_9$ and $R_7$ to give a reading on the recorder of 235° C. plus the temperature of the winding R at the time of adjustment is suitable to establish the above-mentioned match. It will be understood that this temperature setting will vary depending on the material employed for winding R.

Next the switch G1, G2, G3 is turned to the run position 1 (FIG. 2) and the bridge adjusted, through adjustment of $R_5$, so that the recorder P indicates the motor winding temperature at the time of adjustment. This adjustment at $R_5$ is most conveniently made when the winding R is in the cold (room ambient) condition.

The rotary switch G1, G2, G3 is then returned to the disconnect position 3 (FIG. 4), which places the ballast resistance 79 in the bridge arm A–D. The resistance 79 is adjusted so that the recorder reads about 10° C. below its expected deenergized temperature, which prepares or prepositions the scriber so that a minimum time is required to move the scriber to begin a precise recording of the temperature of the heated winding after the opening of switch 21. Note that sections G1 and G2 of the rotary switch at this time excite circuit IV so as to cause switch elements 75 and 77 of relay switch 73 to cut resistance 79 into the bridge arm A–D.

After calibration, to ascertain temperatures of R the switch G1, G2, G3 is returned to the run position 1 and testing started by closing switch 13. At this time the thermostatic switch 21 is cold and closed. Start relay 29 then closes and the D.C. time-delay relay circuit IV is excited. Relay 73 then moves switch elements 75 and 77 to hold the ballast resistance 79 in the bridge arm A–D. At the same time, the relay switch element 87 closes to excite starting relay Section VI, which closes the contactor 31, thus exciting both windings S and R with A.C. current over lines 17 and 25. Relay 29 will in due time cut out the winding S, but winding R will be left connected across lines 17 to be excited by A.C. therein. Under any unusual conditions such as overload or locked rotor of the motor, the winding R will heat and ultimately the thermostatic switch 21 will open the lines 17. This de-energizes the relay circuit IV, which causes the relay 73 and relay switch elements 77, 75 and 87 to take the position shown in FIG. 1. This connects the motor winding R into the D.C. excited bridge arm A–D. It also de-energizes relay circuit VI, which causes opening of the contactor 31. Thus winding R is taken off the A.C. lines 17 and inserted into the bridge arm A–D for resistance measurement and recording by the recorder P under application of D.C. from Section III.

Assuming that the bridge is adjusted, as described above, when the ballast resistance 79 is in its arm A–D, the substitution of the hot winding R will change the voltage differential between points A and B on the bridge, so that the recorder P will correspondingly move to make a record on its moving chart. It is to be understood that the recorder has associated with its continuous bridge-balancing mechanism the usual moving recorder chart and a coupled scriber adapted to form a trace indicating resistance and consequently temperature changes of the winding R. After a cooling period, the thermostatic switch 21 will reclose, thus repeating the cycle wherein ballast resistance 79 is substituted for winding R in bridge arm A–D and motor winding R replaced on the A.C. lines 17 for excitation and possible reheating if the unusual conditions causing the original heating have not been eliminated. If these conditions have not been eliminated, then the protector 19 cyclically and alternatively cuts the winding R and ballast resistance 79 into and out of the bridge arm A–D, the recorder P maintaining a constant record of the resulting changes in winding resistance and the related temperature thereof.

When the tripping action of the protector 19 opens the circuit 17 to winding R, there will be A.C. transients in the winding as tripping occurs. It is for this reason that the time-delay circuit IV is employed, since it has the effect of keeping the winding R out of the bridge arm A–D and keeping the ballast resistance 79 in this arm until these transients have disappeared. This affords accurate temperature indications by the recorder which are not influenced by A.C. transients. This is one of the advantages of the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Resistance-change temperature-measuring apparatus for a conductive device, comprising a potentiometer, a resistance bridge, said bridge including first, second, third and fourth conductive arms having first, second, third and fourth junctions therebetween, a power circuit which when energized passes heating current through said device, a ballast resistance, a time-delay relay circuit responsive to energization of said power circuit for inserting said ballast resistance into the first arm of the resistance bridge when said power circuit is energized and removing the ballast resistance from said first arm of the resistance bridge and, with time delay, transferring said device from the power circuit to said first bridge arm when said power circuit is deenergized, two series-connected resistances forming said second arm between the second and third junctions, pairs of series-connected resistances one of which pairs forms a third arm between the third and fourth junctions and the other of which pairs forms a fourth arm between the first and fourth junctions, voltage supply leads attached to the second and fourth junctions, a voltage supply circuit connected between said voltage supply leads and said power circuit, potentiometer leads attached to the first and third junctions and extending to said potentiometer, and a by-pass switch adapted to form a by-pass connection from a point between said resistances in the second arm and the potentiometer lead connected with the third junction.

2. Apparatus according to claim 1, wherein said relay circuit includes switch means coordinated with said by-pass switch to open the relay circuit when said by-pass switch is in by-passing position.

3. Resistance-change temperature-measuring apparatus for a conductive device, comprising a potentiometer, a D.C. resistance bridge connected with said potentiometer, said bridge including first, second, third and fourth conductive arms having first, second, third and fourth junctions therebetween, an A.C. power circuit which when energized passes A.C. heating current through said device, a thermal switch in said power circuit, a ballast resistance, transfer switch means, a relay circuit responsive to energization of said A.C. power circuit for moving the transfer switch means to insert said ballast resistance into the first arm of the resistance bridge when said A.C. power circuit is energized and to remove the ballast resistance from said first arm of the resistance bridge and transfer said device from the A.C. power circuit to said first arm of the resistance bridge when said A.C. power circuit is de-energized, two series-connected resistances forming said second arm between the second and third junctions, pairs of series-connected resistances one of which pairs forms a third arm between the third and fourth junctions and the other of which pairs forms a fourth arm between the first and fourth junctions, voltage supply leads attached to the second and fourth junctions, and a D.C. voltage supply circuit energized from said power circuit, potentiometer leads attached to the first and third junctions.

4. Apparatus according to claim 3, including gang-operated switch means having a first element adapted to form a by-pass connection from a point between said resistances in said second arm and the potentiometer lead connected with said third junction, said switch means including a second element in said relay circuit adapted to open the relay circuit when its first element is in by-pass position.

5. Resistance-change temperature-measuring apparatus for a conductive device, comprising a potentiometer, a resistance bridge connected with said potentiometer, said bridge including first, second, third and fourth conductive arms having first, second, third and fourth junctions therebetween, a power circuit which when energized passes heating current through said device, a thermal switch in said power circuit for deenergizing said power circuit when overloaded, a ballast resistance, transfer switch means for inserting said ballast resistance into the first arm of the resistance bridge when said power circuit is energized and removing the ballast resistance from said first arm of the resistance bridge and transferring said device from the power circuit to said first arm of the resistance bridge when said power circuit is deenergized by said thermal switch, two series-connected resistances forming said second arm between the second and third junctions, resistances in said third and fourth arms, voltage supply leads attached to the second and fourth junctions, a voltage supply circuit connected between said voltage supply leads and said power circuit, potentiometer leads attached to the first and third junctions, and gang-operated switch means having a first element adapted to form a by-pass connection from a point between said resistances in said second arm and the potentiometer, said switch means including a second element controlling said transfer switch to cause it to insert said device in said first arm when said by-pass connection is formed by said first gang-operated switch element.

6. Resistance-change temperature-measuring apparatus for a conductive device, comprising a potentiometer, a resistance bridge connected with said potentiometer, said bridge including first, second, third and fourth conductive arms having first, second, third and fourth junctions therebetween, a transformer, a substantially constant-voltage rectifier circuit connected with the second and fourth junctions to supply D.C. thereto, an A.C. power circuit having a first branch which when energized passes A.C. heating current through said device and a second branch which passes A.C. to said transformer, a ballast resistance, transfer switch means, a time-delay relay circuit selectively responsive to energization of said first branch for inserting said ballast resistance into said first bridge arm when said first branch is energized and removing said ballast resistance therefrom and transferring said device thereto when said first branch is deenergized, two series-connected resistances forming said second bridge arm between the second and third junctions, D.C. voltage supply leads connected to the second and fourth junctions and leading from said constant-voltage rectifier circuit, potentiometer leads attached to the first and third junctions, gang-operated switch means having a first element adapted to form a by-pass connection from a point between said resistances in said second arm and the potentiometer, said switch means including a second element controlling said time-delay relay circuit to disconnect it when the first switch element is in closed by-pass position.

7. Resistance-change temperature-measuring apparatus for an electrically conductive device, comprising a potentiometer, a D.C. resistance bridge circuit connected with said potentiometer, an A.C. power supply, an A.C. exciter circuit between said power supply and said device, a substantially constant-voltage rectifier circuit between said power supply and said bridge, a contactor switch and a thermal switch in said exciter circuit, a ballast resistance, a starting circuit for said contactor switch, a switching circuit connected between said device and contactor switch in said A.C. exciter circuit, said switching circuit including a ballast resistance, a relay switch having switch contacts in said starting circuit and in said switching circuit, a time-delay relay circuit connected with said exciter circuit and controlling said relay switch, whereby when said thermal switch is open said device is placed by the relay switch in the bridge circuit and when said thermal switch is closed said device is removed by said relay switch from said bridge circuit and the ballast resistance inserted therein.

8. Apparatus according to claim 7, wherein said time-delay circuit includes an A.C. rectifier therein and a D.C. operating coil for said relay switch.

References Cited by the Examiner
UNITED STATES PATENTS

| | | | |
|---|---|---|---|
| 1,460,530 | 7/23 | Brown et al. | 324—62 |
| 2,434,610 | 1/48 | Feiker | 324—98 X |
| 2,565,922 | 8/51 | Howard | 324—106 |
| 2,571,791 | 10/51 | Tompkins | 324—65 |
| 2,772,395 | 11/56 | Runaldue et al. | 324—62 |
| 2,912,644 | 11/59 | Makous | 324—62 |
| 2,938,385 | 5/60 | Mack et al. | 73—362 |
| 2,978,364 | 4/61 | Blaustein | 324—62 X |

OTHER REFERENCES

"Bridges and Their Applications," Borden et al., Instruments, November 1934, vol. 7, pp. 229–244.

WALTER L. CARLSON, *Primary Examiner.*
SAMUEL BERNSTEIN, *Examiner.*